July 30, 1963
M. I. GERSTINE
3,099,421
AUTOMATIC TRIM ACTUATOR SYSTEM
Filed Dec. 1, 1961
2 Sheets-Sheet 1
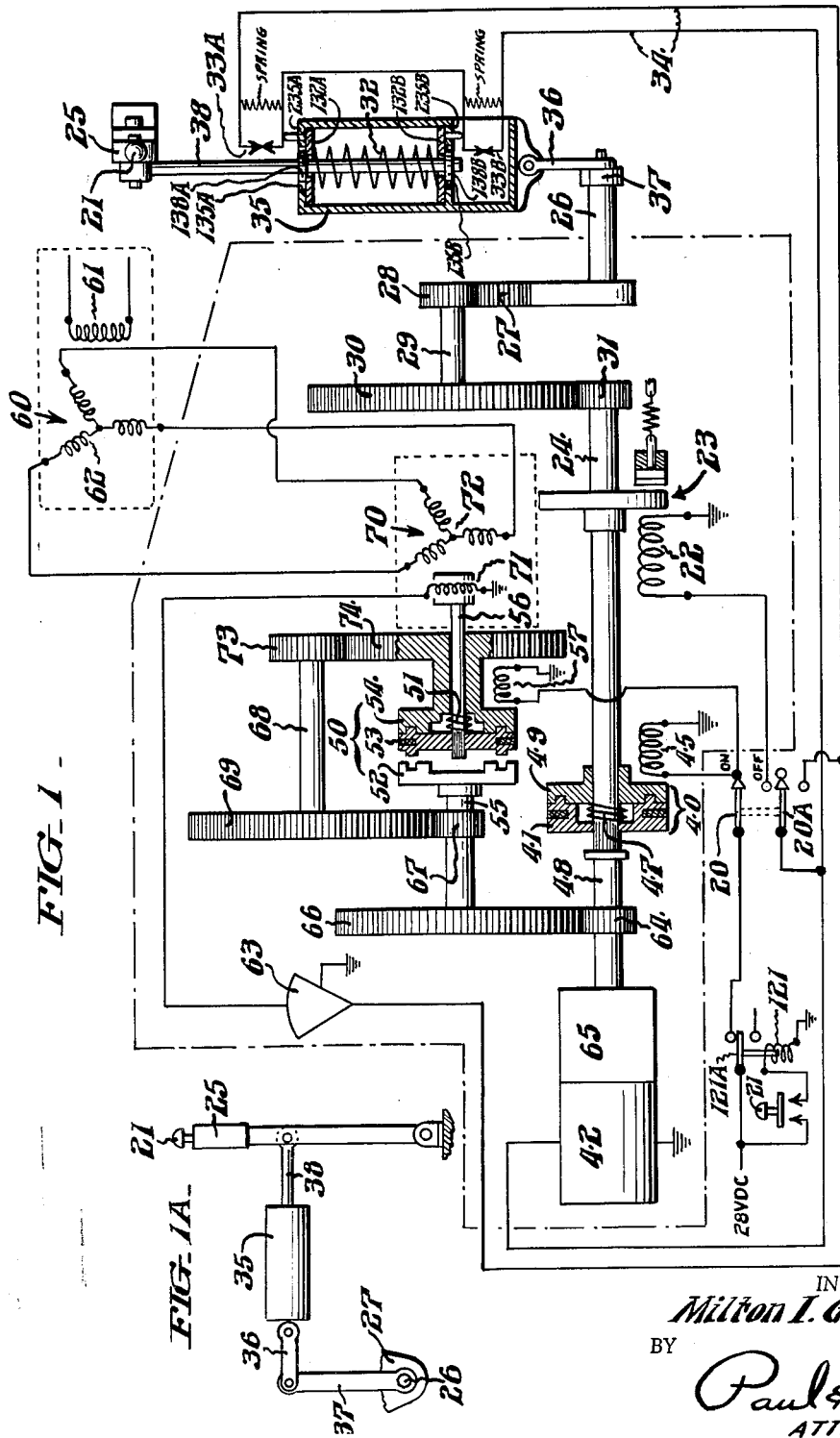
INVENTOR.
*Milton I. Gerstine,*
BY
*Paul & Paul*
ATTORNEYS.

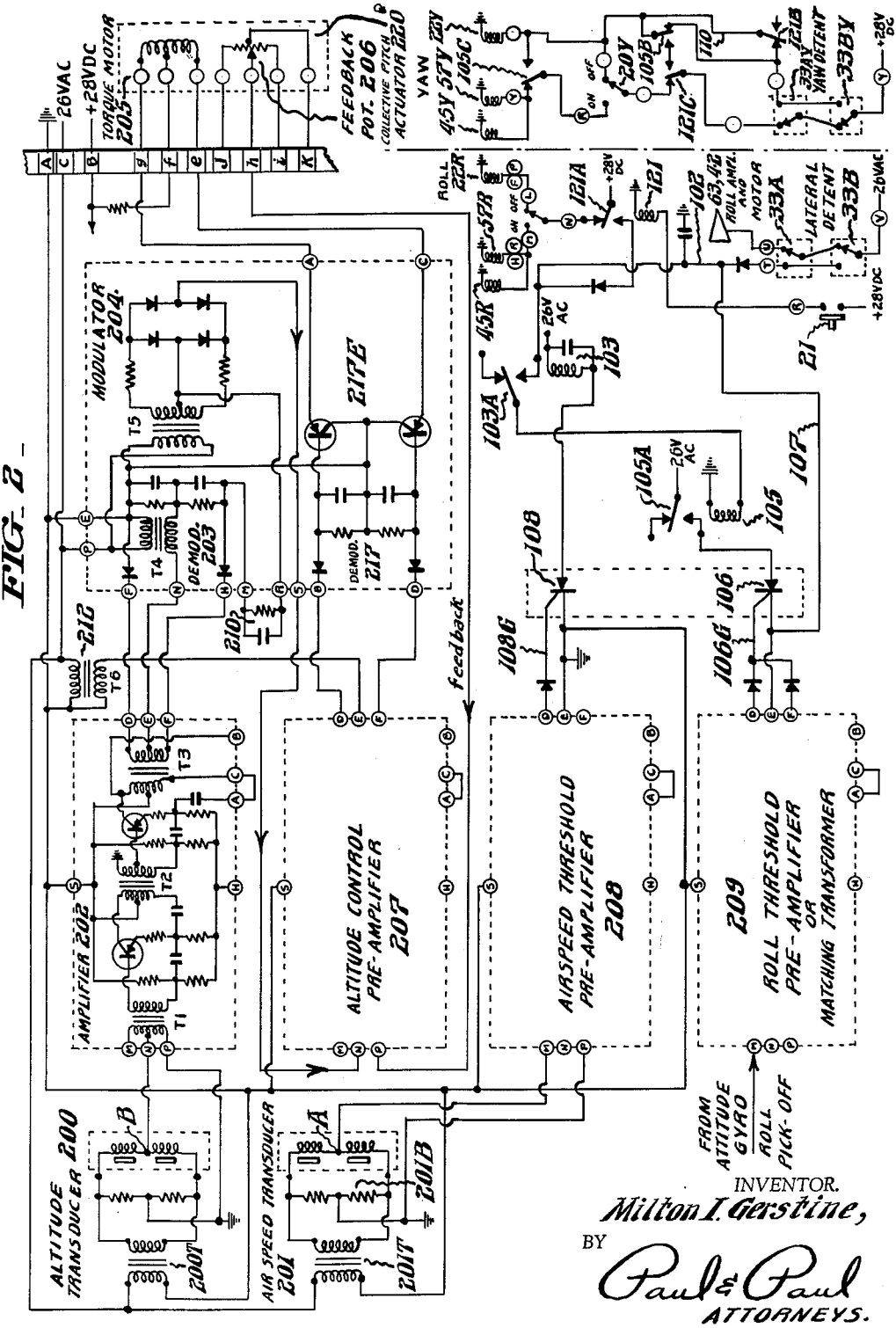

United States Patent Office 3,099,421
Patented July 30, 1963

3,099,421
AUTOMATIC TRIM ACTUATOR SYSTEM
Milton I. Gerstine, Ardentown, Del., assignor to The Boeing Company, Seattle, Wash., a corporation of Delaware
Filed Dec. 1, 1961, Ser. No. 156,301
10 Claims. (Cl. 244—17.13)

This invention relates to an auto-pilot system for a helicopter or other aircraft of the vertical take off and landing type. The auto-pilot system includes two separate and distinct types of automatic flight control systems. The present invention relates particularly to one of these two systems, namely, to an automatic trim system adapted for use in a helicopter which is being automatically stabilized by the other of the two systems, namely, by an automatic stabilization system.

An auto-pilot for a helicopter is to be distinguished from an auto-pilot for a fixed wing aircraft. A fixed wing aircraft is basically stable, and an auto-pilot for a fixed wing craft need ordinarily supply only a long-term reference to hold the basically stable craft on a fixed heading and at a fixed altitude. A helicopter, on the other hand, is a basically unstable craft, and any auto-pilot system for a helicopter must also perform a fairly difficult stabilization task, as well as to accomplish flight guidance. Moreover, stabilization must be accomplished with no loss in the maneuverability of the craft and with no loss in control feel.

To meet the difficult requirements of an auto-pilot for a helicopter, it is proposed to provide two separate types of automatic flight control in the craft. One of these is an automatic stabilization system, the function of which is to make the helicopter a stable craft. This is done by providing automatic stabilization for each of the three axes of the craft—roll, pitch and yaw. Such an automatic stabilization system is shown described and claimed in my co-pending patent application entitled "Automatic Stabilization of Aircraft," filed November 14, 1961, Serial No. 152,188.

The other of the automatic flight control systems proposed, in accordance with my inventions, for helicopter flight control is an automatic trim system. This system is supplementary to the automatic stabilization system described in my co-pending application referred to above. The automatic trim system is shown, described and claimed herein. It comprises essentially an attitude, heading and altitude locking system.

The object then of the present invention is to provide for a helicopter a simple automatic trim system which will provide automatically such trim corrections as may be necessary during normal steady flight.

A more specific object is to provide for an independently stabilized helicopter a simple automatic system which will provide the auto-pilot function of maintaining attitude, altitude and heading.

In fixed wing type of aircraft, the auto-pilot stabilizes by causing, in a given axis, an actuator motion proportional to the magnitude of the error in that axis plus the rate of change of the error. In the auto-pilot system contemplated herein, the rate of change signal is supplied by a separate automatic stabilization system, described in my aforesaid co-pending patent application, while the proportional signal is supplied by the automatic trim system described herein. This automatic trim system is adapted to make, through a trimming actuator for each axis, the small corrections which the pilot would ordinarily make to hold the craft at its existing fixed attitude, heading and altitude. The trimming motions are small and slow, as compared with those made by the automatic stabilization system. For example, in the automatic trim system, the maximum velocity of the cyclic stick or rudder pedal may be limited to about one inch per second.

The automatic trim system is so arranged that the pilot control feel is substantially the same whether the trim system be turned on or not. Also, the automatic trim system will continue to function even though there be a failure in the separate and independent automatic stabilization system.

The automatic trim system is small, light in weight, has a minimum of moving parts, and ordinarily requires no adjustments.

A separate trim actuator is provided for each of the four axes—pitch, roll, yaw, and altitude. Each actuator is adapted to provide either synchronization or stabilization, as desired by the pilot. The term "synchronization" is herein used to define the action of the automatic trim system when it follows changes in the attitude, heading, or altitude of the craft without, however, delivering any force to the flight controls (cyclic stick, rudder pedal, or collective pitch stick) to oppose or correct such changes. The term "stabilization" is used to define the action of the automatic trim system when it delivers a force to the flight controls to correct departures of the craft from its previous attitude, heading or altitude.

The present invention will be best understood from the following detailed description of a preferred embodiment of the invention selected for illustration in the drawing in which:

FIG. 1 is a diagrammatic plan view partly in section illustrating one of the actuator units. A separate unit of the type shown in FIG. 1 is employed for each of the three axes, roll, pitch and yaw, and, if desired, may also be employed for the fourth axis, altitude. However, the present specification describes a different type of actuator for the fourth axis.

FIG. 1A is a diagrammatic view in elevation of a portion of FIG. 1.

FIG. 2 is a schematic diagram of the electrical system. The circuitry shown in FIG. 2 includes that related to altitude stabilization as well as that relating to attitude and heading stabilization. For stabilization of altitude, the system shown in FIG. 2 assumes the employment of a differential hydraulic extensible actuator similar to that employed in the automatic stabilization system described in my aforesaid co-pending patent application.

Referring now to FIG. 1 this figure shows the actuator which provides, in the system described herein, the stabilization (or synchronization) for the roll, pitch and yaw axes. As indicated previously, this type of actuator may also be employed for the fourth axis, altitude, but a different type of actuator is shown herein for the altitude axis.

A separate actuator unit of the type shown in FIG. 1 is provided for each of the two axes, roll and pitch and also, with some slight modifications, for the yaw axis.

The actuator unit of FIG. 1 may be operated "On" in any one of three different modes, namely, stabilization, synchronization or maneuvering. In a fourth mode, the actuator unit is "off". Each of these four modes will now be described. It will facilitate an understanding of the actuator of FIG. 1 to describe first its action when "Off".

*Automatic Trim System "Off"*

The On-Off switch 20 shown in FIG. 1 has multiple contacts and controls the On-Off condition of each of the three actuator units of the automatic trim system, namely, the roll actuator, the pitch actuator and the yaw actuator. In addition, switch 20 has an arm 20A for shorting the conductors 34, when the switch is in the Off position. This arm 20A is only in the roll and pitch actuators. It is not in the yaw actuator. The purpose of arm 20A is to short out the detent switches 33A, 33B when the automatic trim system is Off, thereby to allow the trim system to synchronize automatically when the craft is being flown manually.

Assume that switch 20 is in the Off position. A 28-volt D.C. circuit is then completed through winding 22 of the magnetic brake 23, and the brake is energized into locking position. This assumes that the push-button 21 is not depressed by the pilot to open the circuit and de-energize the magnetic brake. With magnetic brake 23 energized and locked, rotational movement of shaft 24 is prevented. This prevents rotational movement of output shaft 26 since the shafts 24 and 26 are connected together through pinion 31, gear 30, shaft 29, pinion 28, and gear sector 27.

In the diagrammatic plan-view in FIG. 1 the reader is looking down on the top of the pilot's cyclic stick 25. As seen more clearly in FIG. 1A, cyclic stick 25 is pivoted at its lowermost end and above its pivot point one end of a lateral arm 38 is pivotally connected. Mounted at the other end of arm 38 is a pre-loaded compression spring 32 held compressed on arm 38 between annular disks 132A and 132B, as seen in FIG. 1. The disks 132A and 132B are normally held by the spring 32 against the collars 138A and 138B fixed to the arm 38 at the spaced apart locations shown in FIG. 1. Spring 32 and disks 132A and 132B are held captive within a housing 35, one end of which has an axial opening 135A formed by end flange 235A for receiving the arm 38 and collar 138A. Spaced inwardly from the other end of housing 35 is an internal flange 235B forming an axial opening 135B through which the end of arm 38 and collar 138B may pass into end compartment 335 of housing 35. Openings 135A and 135B are too small to allow the disks 132A and 132B to pass, and thus flanges 235A and 235B serve as stops for the disks 132A and 132B, respectively.

The pre-loaded spring 32 functions as a centering spring for holding the cyclic stick 25 (or rudder pedal) in, or returning it to its trimmed or detent position.

As shown diagrammatically in FIG. 1, secured to the annular disks 132A and 132B are micro switches 33A and 33B connected in series in lead 34 and adapted, when the spring 32 is in its normal centered detent position to connect leads 34 together, as is represented diagrammatically in FIG. 1 by the compression springs there shown. When, however, the arm 38 is moved relative to housing 35 to compress further spring 32, one or the other of the detent switches is moved to open the leads 34. A more complete description of what happens when the micro switches 33A and 33B are moved out of detent position is given hereinafter in connection with the description of the electronic circuitry of FIG. 2.

Referring again to FIGS. 1 and 1A, it will be seen that housing 35 is pivotally connected by a rigid arm 36 to the upper end of a vertical arm 37, the lower end of which is fixed to shaft 26.

It should be understood that a separate centering-spring structure is provided for each of the three axes. The yaw centering spring is, of course, connected to the rudder pedal, while two centering springs are connected to the cyclic stick, one lateral for the roll axis and the other longitudinal for the pitch axis.

It will be seen that, when the automatic trim system is turned Off, which is the condition now being described, when the pilot moves his cyclic stick (or rudder pedal), the arm 38 moves but arm 36 is unable to move, being connected to shaft 26 which is locked against rotational movement by reason of being connected to locked shaft 24. Thus, housing 35 is unable to move. Accordingly, when arm 38 is moved, center spring 32 is further compressed, the centering spring 32 is moved out of its detent position, and the conductors 34 are opened at the detent switch 33A or 33B. This, however, is of no consequence since the switches 33A and 33B, in the roll and pitch actuators, are shorted out by the arm 20A when the switch is in the Off position. In the yaw actuator, as will be clear from FIG. 2, the detent switches 33AY and 33BY are not connected in, and hence do not open, the servo loop feeding back to the motor 42; thus, opening a detent switch in the yaw actuator merely opens the circuit to the clutch coils 45Y and 57Y. However, this changes the yaw actuator from stabilization mode to synchronization mode. Thus, in each of the attitude and directional systems, the actuator provides synchronization, even though the automatic trim system is turned Off. In the altitude system, synchronization is also provided when the trim system is Off, since both chambers of the pressure transducer are open to atmosphere until the pilot presses a button to close the reference chamber.

In each of the axes in which actuators of the type shown in FIG. 1 are employed, when the pilot releases the cyclic stick 25 (or rudder pedal in the directional system), the pre-loaded centering spring 32 acts to return the cyclic stick (or rudder pedal) to its detent position in which spring 32 is centered and the detent switches 33A and 33B are closed.

As the pilot continues to fly the craft manually, i.e., with the On-Off switch of the automatic trim system in the Off position, synchronization action is provided in the roll, pitch and yaw axes by the automatic trim actuators of FIG. 1, i.e., the actuators follow the changes in the attitude and heading, as will now be described.

Assume that, with the pilot flying the craft manually, he voluntarily causes, or a gust of wind or other external force causes the craft to change its attitude and/or heading. Such change would be sensed by the attitude and/or directional gyros 60 associated with the axes affected since rotor coil 61 would rotate with the gimbal of the gyro. It may be mentioned at this point that only one vertical gyro need be employed for the pitch and roll axes but separate pick-off windings are then required for the pitch and roll axes. A reference current, for example, 400 c.p.s. current, flows through the gyro rotor coil 61 and, accordingly, when the aircraft changes its attitude or heading, coil 61 changes its position relative to the stator windings 62. Hence, the voltages induced in each of the three stator windings 62 also change. As a result of the changes in the voltages induced in the three windings 62 of the stator of gyro 60, the currents through the three windings 72 of the stator of the control transformer 70 change, and an error-signal voltage is induced in rotor coil 71. This signal is fed back through the amplifier 63 to the actuator servo motor 42 by way of the detent switches 33A and 33B. The motor 42 drives pinion 64 through the gear reduction unit 65 and the shaft 48 is driven rotationally. The rotation of shaft 48 is not, however, transmitted to shaft 24 since magnetic clutch 40 is not in engaged condition, there being no current through clutch winding 45 when switch 20 is Off. With clutch 40 not energized, the left plate 41, which is splined to shaft 48, is held by spring 47 out of engagement with the right clutch plate 49, keyed to shaft 24. Thus, the flight controls of the aircraft are disconnected from the automatic trim actuator and thus there is no automatic stabilization of the craft. There is, however, synchronization as will be seen from the following:

Pinion 64, driven by motor 42 in response to the error-signal voltage developed in rotor coil 71, drives gear 66, and pinion 67 and shaft 55 rotate. The rotation of shaft 55 is transmitted directly to rotor shaft 56 through the left plate 52 (which is keyed to shaft 55) and the center plate 53 of the duplex clutch 50 (which is splined to rotor shaft 56). The plates 52 and 53 are in engagement by reason of the force of spring 51 and the fact that the clutch winding 57 is not energized. The rotor coil 71 is thereby rotated in a direction to null the output of the rotor, i.e., in a direction tending to reduce the error-signal voltage to zero. This action is relatively fast, for example, 120° per second and synchronization is thus rapidly accomplished.

Automatic Trim System "On" (Stabilization)

When the pilot wishes to maintain automatically the helicopter on its existing heading and at its existing attitude, he turns on the automatic trim system by switching the switch 20 to its On position. This de-energizes brake 23, energizes clutch 40, and also energizes duplex brake clutch 50. De-energizing brake 23 releases the brake and allows the shaft 24 to rotate when driven. Energizing clutch 40 causes the left plate 41 to engage the right plate 49 against the action of compression spring 47, as shown in FIG. 1. Thus, shaft 48 becomes connected to the shaft 24. Energizing duplex clutch 50 causes the center plate 53, which is splined to rotor shaft 56, to disengage from the left plate 52 and to engage the right plate 54 against the action of the compression swing 51, as shown in FIG. 1. This disengages rotor shaft 56 from shaft 55, but the rotor shaft 56 continues to be driven by the pinion 67 through a greater gear reduction, comprising gear 69, shaft 68, pinion 73 and gear 74. Thus, in stabilization, servo motor 42 drives the rotor coil 71 through a greater gear reduction than when the system is merely synchronizing, as previously described. The desired gear reduction is determined by the gain required for stabilization of the helicopter, i.e., by the output rotation required per degree of synchro rotation.

It will be seen then that when the switch 20 is On and the push-button 21 is not depressed, the automatic trim system is in stabilization and any change in the attitude or heading of the craft will be sensed by the attitude or directional gyros 60 and an error-signal voltage will be induced in rotor coil 71 of the control transformer 70 and fed back through the amplifier 63 and detent switches 33A and 33B to the motor 42 to drive the output pinion 64 through gear reduction unit 65. Clutch 40 is in engaged condition, brake 23 is in released condition, and output arm 36 is moved through the pinions and gears 31, 30, 28, and 27. When output arm 36 is thus moved, the housing 35 moves in a corresponding manner, the centering spring 32 remains in its detent position, and the cyclic stick 25 (or rudder pedal in the yaw actuator) is moved by the arm 38 to change the flight controls of the craft in a direction to bring the craft back to its former attitude and/or heading.

While the stabilizing action above described is taking place, the gear reduction system comprising gear 66, pinion 67, gear 69, pinion 73 and gear 74 is simultaneously being driven to rotate the error-signal rotor coil 71 in a direction to reduce the induced voltage to zero. The movement of rotor coil 71 is, however, slower than when the actuator is merely synchronizing. In a typical case, pinion 64 and gear 66 may effect a reduction of 6:1, pinion 67 and the gear 69 may effect a second reduction of 6:1, and pinion 73 and gear 74 may effect a reduction of 4:1, a total reduction of 144:1 in the rotor-coil drive chain when the trim system is in stabilization. This compares with a total reduction of 36:1 when the automatic trim system is merely synchronizing.

In the stabilization output system, pinion 31 and gear 30 may effect a reduction of 6:1, while pinion 28 and gear sector 27 may effect a second reduction of 6:1, a total reduction of 36:1. Thus, in the present example, the flight control output is moved 4° for each 1° rotational movement of the error-signal-producing rotor coil 71.

It will be seen then that the automatic trim system is effective to move the flight control output arm through an angle proportional to the error signal sensed by the attitude gyro (pitch or roll) or by the directional gyro (yaw or heading).

Automatic Trim System "On" (Maneuvering)

Assume now that when the pilot is flying the craft with the automatic trim system On, he desires to make a temporary change in attitude, i.e., in pitch and/or roll. With the system shown, the pilot may readily make such a temporary change. He merely moves the cyclic stick 25. This will move the centering spring 32 out of its detent position since the housing 35 and arm 36 will resist being moved. This resistance to movement is by reason of housing 35 and arm 36 being connected back through engaged clutch 40 to the gear reduction unit 65 and the drive motor 42, now not energized. With the centering spring 32 moved out of detent position, the conductors 34 are opened at one of the detent switches 33A or 33B. This breaks the circuit connection between the error-voltage-developing rotor coil 71 and the servo motor 42. With motor 42 not energized, no motion takes place in the flight control gears (31, 30, 28, 27) and when the pilot releases the cyclic stick 25, the centering spring 32 will return arm 38 and cyclic 25 to their original detent position, thus re-applying power to motor 42 to allow the automatic trim system to return the craft to its previous attitude.

The maneuvering action just described applies to both the pitch-axis and the roll-axis actuators. It does not, however, apply to the yaw-axis actuator since the pilot does not ordinarily make a temporary change in heading, and the automatic trim system makes no provision for his so doing. In the yaw system, the actuator is always synchronizing when it is not stabilizing. This is described below.

Automatic Trim System "On" (Synchronization)

Assume that while flying the craft, either in forward flight or hover, with the automatic trim system On, the pilot decides to makes a permanent change in attitude, i.e., in pitch and/or roll. To do so, he depresses push-button 21 before moving the cyclic stick 25. (The push-button 21 is mounted on the top of the cyclic stick for ready depression by the pilot's thumb.) Depressing button 21 opens the 28-volt D.C. circuit and de-energizes clutch windings 45 and 57, as shown in FIG. 1.

Winding 45 is in the stabilization system of the actuator, and when de-energized by depressing push-button 21, the clutch plates 41 and 49 disengage, and shaft 24 is disconnected from shaft 48. Decoupling of shaft 24 from shaft 48 permits the pilot to move the cyclic stick 25 without moving the centering spring 32 out of detent position since movement of the housing 35 and arm 36 is no longer opposed by the gear reduction unit 65 and motor 42.

Clutch winding 57 is in the synchronization system of the actuator and when de-energized by the depression of push-button 21, the clutch plates 52 and 53 are pressed into engagement by spring 51 and rotor shaft 56 becomes directly coupled to shaft 55. This permits the rotor coil 71 to follow more quickly the changes in the attitude of the craft sensed by the gyro 60.

It will be seen from the above that when the pilot first depresses push-button 21 and then changes the attitude of the craft, on either or both the pitch and roll axes, the error-voltage rotor coil 71 is caused to follow the change relatively rapidly so that when the pilot, after completing the attitude change, releases the button 21, no error voltage is developed in rotor coil 71. Thus, the system is now again ready to stabilize the craft at the new attitude.

Heading changes may be made in any one of three ways, two of which are applicable to forward flight and one of which is applicable to hover. All heading changes are permanent, i.e., the automatic trim system of the yaw axis is always in synchronization when it is not in stabilization. There is no provision in the yaw system for temporary changes in heading such as was described above with respect to temporary changes in attitude.

One way in which a heading change may be made while the craft is in forward flight is by rolling the craft to produce a coordinated turn. To do this, when the automatic trim system is On, the pilot first depresses the push-button 21 and then moves the cyclic stick 25 laterally. The action is the same as that described above with respect to attitude changes made with the push-button 21 depressed. The yaw and roll actuators both perform a synchronizing action in which the rotor coils 71 associated with the directional gyro and with the roll pick-up of the attitude gyro are driven by the servo motors 42 to follow relatively rapidly the change in the attitude and heading of the craft.

To explain more fully what happens during forward flight with the automatic trim system On, when the pilot depresses push-button 21 and then moves cyclic stick 25 laterally to make a coordinated turn, it will be helpful to refer to the electrical circuit shown in FIG. 2. In FIG. 2, all relay contacts are shown in the deenergized position and the centering-spring detent switches are shown in their detent positions.

Referring now to FIG. 2, when push-button 21 is depressed a 28-volt D.C. circuit is closed through the relay winding 121 and relay contacts 121A, 121B and 121C move to their energized positions. Movement of contact 121A to its energized position connects a 28-volt D.C. source to the winding of relay 105 provided relay 103 is in energized condition. As will be described more fully later, relay 103 is in energized condition when silicon-controlled rectifier 108 is conductive, and rectifier 108 is conductive when the craft is moving at a forward speed in excess, for example, of 40 knots. Thus, if the craft is in forward flight (arbitrarily defined herein as in excess of 40 knots) the relay contact 103A is in its lower position and relay 105 becomes energized when the push-button 21 is depressed. Relay contact 105A is then pulled to its lower position and a 26-volt A.C. source is connected to leads 107 and 102 provided the silicon-controlled rectifier is able to conduct. As explained more fully later, rectifier 106 is able to conduct whenever the craft is rolling at an angle in excess, for example, of 3°. Thus, in forward flight and with the automatic trim system On, when the pilot depresses push-button 21 and then moves the cyclic stick 25 laterally to roll the craft into a coordinated turn, as soon as the craft attain a roll of 3°, the relay 105 locks up, since a 26-volt A.C. circuit is closed through rectifier 106, relay contact 103A, and the coil of relay 105. With relay 105 energized, the contacts 105B and 105C (in the yaw system) move to their energized positions and the clutch windings 45Y and 57Y of the clutches 45 and 57 in the yaw actuator are de-energized, and magnetic brake winding 22Y is energized to apply the brake 23 in the yaw actuator. Thus, the yaw actuator goes into its synchronizing mode in which the rotor coil 71 is caused to follow the heading changes sensed by the directional gyro. The application of the brake 23 holds the rudder pedal in its detent position. When the craft completes its coordinated turn and straightens out, the silicon-controlled rectifier 106 ceases to be conductive, and the 26-volt A.C. source is unable to drive current through leads 107, 102, contact 103A, and the winding of relay 105. Thus, relay 105 is de-energized and contacts 105B and 105C in the yaw system return to their de-energized positions, as shown in FIG. 2. This again energizes the clutch windings 45Y and 57Y and puts the yaw actuator back into its stabilizing mode. This assumes, of course, that the push-button 21 has been allowed by the pilot to return to its normal undepressed condition.

A second way in which the pilot may make a heading change while the craft is in forward flight is this: With the automatic trim system On, and without depressing push-button 21 or moving the rudder pedal, the pilot may move the cyclic stick 25 laterally, against the action of the lateral centering spring 32. This moves the lateral centering spring 32 out of detent position. The magnetic brake 23 in the roll actuator is not locked since the automatic trim system is On, but rotation of shaft 26 in the roll actuator is nevertheless prevented by reason of the fact that shaft 26 is connected through shaft 24 and clutch 40 to shaft 48, and shaft 48 cannot move rotationally since it is connected to the reduction gearing 65 and to the de-energized motor 42. It will be understood that the lateral movement of the cyclic stick 25 by the pilot is fast as compared with the time required by the servo-system to sense the change in the craft's flight and to move the actuator in a direction tending to return the stick to its previous position. Moreover, one of the micro-switches 33A and 33B opens at the instant that the cyclic stick is moved by the pilot, thus opening the servo loop to the motor. Thus, the motor 42 is de-energized, as stated above, and the housing 35 of the centering spring 32 is held locked against movement. Thus, when the pilot moves the cyclic stick in a lateral direction, without depressing the push-button 21, the lateral spring 32 is moved out of detent position.

To explain what happens when the lateral spring 32 is moved out of detent position, it will again be helpful to refer to the schematic electrical circuit shown in FIG. 2.

Referring to FIG. 2, when the lateral centering spring is moved out of detent position, as just described, one of the micro-switches 33A or 33B is moved, opening the roll amplifier and motor circuits 63, 42, and connecting 26-volts A.C. to the lead 102. If the helicopter is in hover or slow flight arbitrarily defined as moving at a forward speed of less than 40 knots, the silicon controlled rectifier 108 in the air-speed sensing system will be non-conductive, the relay 103 will be in de-energized condition, and the conductor 102 will be open at the relay contact 103A. If, however, the helicopter is moving at a forward flight speed in excess of 40 knots, the silicon controlled rectifier will be conducting, the relay 103 will be in energized state, and the contact 103A will be in its energized lower position, thus completing the circuit from the 26-volt A.C. source to ground through the detent switch 33A or 33B, conductor 102, contact 103A, and the winding of relay 105. When relay 105 is thus energized, arm 105A is pulled to its energized lower position and 26 volts A.C. is applied to the silicon-controlled rectifier 106. If the signal from the roll pick-off of the attitude gyro 60 is sufficiently large, in the present example, when the roll is greater than 3°, the rectifier 106 will be conductive and the 26-volt A.C. current will flow through the conductor 107, the conductor 102, the contact 103A, and the relay 105, thus completing the loop and forming a hold circuit which assures that relay 105 will remain energized so long as the roll exceeds 3° and the forward speed exceeds 40 knots even though the initiating voltage be removed by the lateral centering-spring returning to its detent position (this being the position illustrated in FIG. 2).

When relay 105 is energized, the relay contact 105C in the yaw circuit is moved from the left contact position to the right contact position, as seen in FIG. 2. This opens a circuit through the clutch windings 45Y and 57Y, and completes a circuit from the 28-volt D.C. supply through the yaw detent switches 33AY and 33BY in the detent position (as illustrated in FIG. 2), through the magnetic-brake relay contact 121C in the de-energized left ccontact position, through the On-Off switch arm 20Y in the On position, the contact 105A in the right contact position, and through the winding 22Y of the magnetic brake of the yaw system. De-energizing the windings 45Y and 57Y of the clutch and duplex clutch, respectively, in the yaw system, takes the yaw actuator out of stabilization mode and puts it into synchronization mode. The yaw centering spring 32 is in the yaw detent position, since the rudder pedal has not been moved. Thus, the circuit from the error-voltage-producing rotor coil 71 of the control transformer 70 of the yaw circuit remains completed through the amplifier 63 and motor 42, and the rotor coil 71 is caused (through pinions and gears 64, 66, 67, 69, 73, and 74) to follow the changes in the heading of the craft as sensed by the directional gyro 60.

The application of brake 23 to shaft 24 of the yaw axis, when the cyclic stick is moved laterally to move the lateral centering spring out of detent, serves to hold the rudder pedal in trim position. If the brake were not applied to the shaft 24 of the yaw axis, as just described, then when the clutch 40 is disengaged, as described above, for the purpose of enabling the yaw system to synchronize without stabilizing, the rubber pedal would be free to move and the pilot would lose his heading trim.

It was stated hereinabove that the silicon controlled rectifier 108 is conductive when the airspeed of the craft exceeds 40 knots and that the silicon controlled rectifier 106 is conductive when the roll of the craft exceeds 3°. A silicon controlled rectifier is a known form of rectifier generally similar to an ordinary rectifier but modified to block current flow in the forward direction until a small signal is applied to the gate lead, 108G or 106G in FIG. 2, as explained hereinafter. After the gate signal is applied, the silicon controlled rectifier conducts in the forward direction with a forward characteristic very similar to that of an ordinary rectifier.

In FIG. 2, an airspeed transducer 201 is provided for detecting the forward airspeed of the helicopter. Airspeed transducer 201 is a known form of pressure transducer and may, for example, be Model S-40RP±0.5D, manufactured by Ultradyne, Inc., of Albuquerque, New Mexico. A 400 c.p.s. reference current from a 26-volt A.C. source is applied to the primary winding of the transformer 201T used to energize the airspeed transducer 201 and a signal voltage is developed across the bridge circuit 201B of the transducer. A signal is picked off at point A which is a function of the airspeed of the craft as sensed by the pressure transducer. This signal is applied to the airspeed threshold pre-amplifier 208, the output of which is applied to the gate lead 108G of the silicon controlled rectifier 108. The circuit values are so chosen that the output signal from the pre-amplifier 208 is not sufficient to trigger the rectifier 108 unless the airspeed of the craft is in excess of about 40 knots.

In FIG. 2, a roll-threshold matching-transformer or pre-amplifier 209 is provided to the input circuit of which a signal from the roll pick-off of the attitude gyro is applied. This signal is amplified, if necessary, and then applied to the gate lead 106G of the silicon controlled rectifier 106. The circuit values are so selected that the output signal from unit 209 is not sufficient to trigger the rectifier 106 unless the roll of the craft exceeds about 3°.

This completes the description of what happens when, for the purpose of changing his heading, the pilot rolls his craft by moving his cyclic stick 25 laterally without depressing the push-button 21, when the craft is in forward flight.

A third way in which a heading change may be made (and as indicated hereinbefore all heading changes are permanent) is by the pilot moving the rudder pedal out of detent during hover or slow flight. As previously indicated, in the present automatic trim system, slow flight is arbitrarily considered to be a forward speed of less than 40 knots. Assume that the pilot is flying the craft in hover or slow flight with the automatic trim system On. The centering spring 32 of the yaw axis is in the detent position, and its housing 35 is locked against movement by the gear and shaft connections back to the reduction gearing 65 and motor 42, the clutch 40 being engaged. Thus, when the pilot moves the rudder pedal, the centering spring 32 of the yaw axis is moved out of detent position. When this occurs, one of the 33AY or 33BY switches, shown in FIG. 2, is moved to its out-of-detent position, thereby connecting the 28-volt D.C. source to the lead 110 and passing current through the winding 22Y of the brake 23 of the yaw system. The windings 45Y and 57Y of the clutch and duplex clutches 40 and 50, respectively, of the yaw system are no longer energized since the connection to the 28-volt D.C. source is broken when the yaw centering spring is moved out of detent. Thus, the clutch 40 is no longer engaged, while the duplex clutch 50 is in the condition which connects shaft 55 directly to shaft 56 of the rotor coil 71. Thus, the yaw actuator is in synchronization mode. In the yaw actuator system, moving the centering spring 32 out of detent position does not open the feedback circuit from the error-signal-producing rotor coil 71 to the servo motor 42 (as it does in the roll and pitch actuator systems) and, accordingly, when the rudder pedal is moved during hover or slow flight to change the heading of the craft, the yaw actuator system goes into synchronization to follow the change, as described above.

That completes the description of the four modes of operation of the automatic trim actuator systems of the pitch, roll, and yaw axes.

The automatic trim system also provides altitude trim. As shown in FIG. 2, an altitude pressure transducer 200 is provided for sensing the craft's departure from the desired altitude. When the craft reaches the altitude desired, the pilot presses a button to actuate a magnet valve to close from atmosphere one of two pressure chambers of altitude pressure transducer 200. This establishes a reference pressure in the closed chamber. Altitude pressure transducer 200 is a known form of pressure instrument and may, for example, be of the same type as that used for airspeed transducer 201. The instrument is energized by a 400 c.p.s. reference current from the 26-volt A.C. source through a transformer 200T and a voltage signal is developed at point B the polarity and magnitude of which correspond to the direction and extent of the departure of the sensed pressure from the reference pressure. This signal is amplified in the amplifier 202, is then demodulated in demodulator 203, the detected wave is shaped in wave-shaping network 210 and then supplied with a 400 c.p.s. reference wave in modulator 204. The output of modulator 204 is applied to an altitude-control pre-amplifier 207, the push-pull output of which is demodulated in demodulator 217 and then applied through the transistor emitter-follower circuit 217E to opposing ends of the center-tapped winding of torque motor 205 of the collective pitch differential hydraulic actuator 220, shown in block diagram form in FIG. 2. As indicated previously herein, the actuator employed in the altitude system may be of the same type as that shown in FIG. 1 and used in the pitch, roll and yaw systems. However, the present specification assumes that the actuator in the altitude system is similar to that used in the automatic stabilization system shown and described in my aforesaid co-pending patent application, filed November 14, 1961, Serial No. 152,188. In such an actuator, the collective pitch differential hydraulic actuator 220 is driven in one or the other of two opposing directions according to the current flow through the center-tapped winding of torque motor 205, and thus causes the craft to increase or decrease its altitude. As the arms of the collective pitch differential hydraulic actuator move to extend or contract the collective pitch control linkage, the wiper arm of a feedback potentiometer 206, connected mechanically thereto in a manner shown and described in my aforesaid co-pending patent application is moved in a corresponding manner and a proportional feedback signal is fed back to the input of the altitude-control pre-amplifier 207, thus establishing a servo loop.

While the preferred embodiment of this invention has been described in some detail, it will be obvious to one skilled in the art that various modifications may be made without departing from the invention as hereinafter claimed.

Having described my invention, I claim:

1. In a helicopter type of aircraft having flight control means; an automatic trim system comprising gyro means for each of the roll, pitch, and yaw axes for developing, for each axis, an error signal corresponding to the extent only of the departure of the craft from its previous position on that axis; an automatic trim actuator for each axis, each actuator comprising stabilizing means and synchronizing means, said stabilizing means including drive means, means electrically coupling said drive means to said error-signal developing means, and means mechanically coupling said drive means to said flight control means, said drive means being responsive to the error signal developed for that particular axis for changing the position of said flight control means in a direction and to an extent tending to return said craft to its previous position, said synchronizing means including said drive means, said means electrically coupling said drive means to said error-signal developing means, and means mechanically coupling said drive means to said error-signal developing means for changing physically the position of said error-signal developing means toward the null position.

2. Apparatus as claimed in claim 1 characterized in the provision of means for disabling temporarily said stabilizing means and for simultaneously modifying said mechanical coupling means of said synchronizing means for changing said error-signal developing means more rapidly toward the null position.

3. Apparatus as claimed in claim 1 characterized in the provision of means for temporarily disabling said stabilizing means while maintaining effective said synchronizing means.

4. Apparatus as claimed in claim 1 characterized in that said drive means of said stabilizing means is coupled mechanically to said flight control means through a pre-loaded centering spring adapted to function as a rigid link when said automatic trim system is stabilizing and to function at other times as a switch control.

5. Apparatus as claimed in claim 4 further characterized in the provision of a detent switch adapted to be opened when said centering spring is varied from its pre-loaded length.

6. In a helicopter type of aircraft having a cyclic stick; an attitude gyro for developing for each of the attitude axes an error signal voltage proportional to the magnitude only of the departure of the craft from its previous position relative to the particular attitude axis; and an attitude trim actuator for each attitude axis coupled electrically to said attitude gyro and connected mechanically through a pre-loaded centering spring to said cyclic stick for moving said cyclic stick in accordance with the error signal developed for returning the craft to its former attitude.

7. In a helicopter type of aircraft having a flight control system; an automatic trim system comprising detecting means including gyro means for the roll, pitch, and yaw axes and pressure means for the altitude axis for detecting departure of the craft from its previous position relative to the particular axis and for developing an error signal corresponding to the extent only of such departure; stabilizing means including servo motor means coupled electrically to said detecting means and coupled mechanically through a pre-loaded centering spring to the flight control system for changing the flight controls of the craft in accordance with the error signal developed for returning the craft to its previous position relative to that axis; and synchronizing means including said servo motor means coupled electrically to said detecting means and coupled mechanically back to said detecting means and responsive to said developed error signal for moving the error-signal developing means toward the null position.

8. In a helicopter type of aircraft having flight control means; an automatic trim system comprising gyro means for developing for an axis of the aircraft an error signal proportional to the extent only of the departure of the craft from its previous position on that axis; an automatic trim actuator comprising stabilizing means and synchronizing means, said stabilizing means including a servo motor and means coupling said servo motor electrically to said error-signal developing means and mechanically to said flight control means through a pre-loaded centering spring, said servo motor being responsive to the error signal developed for changing the position of said flight control means in a direction and to an extent tending to return said craft to its previous position, said synchronizing means comprising said servo motor and said means coupling said servo motor electrically to said error-signal developing means, and a mechanical linkage from said servo motor to said error-signal developing means for changing physically the position of said error-signal developing means toward the null position.

9. In a helicopter type of aircraft having a cyclic stick, rudder pedals, and a collective pitch stick; first means for developing an electrical error signal proportional to the magnitude only of the departure of the aircraft from a reference position on its pitch axis; second means for developing an electrical error signal proportional to the magnitude only of the departure of the aircraft from a reference position on its roll axis; third means for developing an electrical error signal proportional to the magnitude only of the departure of the aircraft from a reference position on its yaw axis; fourth means for developing an electrical error signal proportional to the magnitude only of the departure of the aircraft from a reference altitude; means connected mechanically with the cyclic stick for moving said cyclic stick in accordance with the error signal of said first developing means to return the aircraft to said reference position on its pitch axis; means connected mechanically with the cyclic stick for moving said cyclic stick in accordance with the error signal of said second developing means to return the aircraft to said reference position on its roll axis; means connected mechanically with the rudder pedals for moving said rudder pedals in accordance with the error signal of said third developing means to return the aircraft to said reference position on its yaw axis; and means connected mechanically with said collective pitch stick for moving said collective pitch stick in accordance with the error signal of said fourth developing means to return the aircraft to said reference altitude.

10. In a helicopter type of aircraft having a cyclic stick and a push-button mounted therein; an automatic trim system including gyro means for the roll and yaw axes for developing, for each of said axes, an error signal corresponding to the extent only of the departure of the craft from its previous position on that axis; an automatic trim actuator for each axis, each actuator having magnetic clutch means and magnetic brake means, each actuator having a stabilizing mode and a synchronizing mode according to the conditions of said clutch means and brake means; airspeed transducer means for detecting the air speed of said craft and developing an electrical signal proportional thereto; first electronic switch means coupled to said airspeed transducer means and adapted to be placed in one state of conduction or the other according to whether the airspeed electrical signal is greater or less than a selected value; roll sensing means coupled to said roll gyro means for developing an electrical signal proportional to the degree of roll of said craft; second electronic switch means coupled to said roll sensing means and adapted to be placed in one state of conduction or the other according to whether the roll electrical signal is greater or less than a selected value; a hold circuit controllable by said first and second switch means; first means coupling a first source of energy to said hold circuit, said first coupling means being connected to and controlled by said push-button on said cyclic stick for changing, when said push-button is operated, the roll and yaw actuators from stabilizing mode to synchronizing mode and for holding said actuators in synchronizing mode until the signal corresponding to either the degree of roll of said craft or to the speed of the craft is reduced to below its selected value; second means coupling a second source of energy to said hold circuit, said second coupling means being controlled by said cyclic stick for changing, when said cyclic stick is moved laterally with said push-button not operated, the roll and yaw actuators from stabilizing mode to synchronizing mode and for holding said actuators in synchronizing mode until the signal corresponding to either the degree of roll of said craft or to the speed of the craft is reduced to below its selected value.

References Cited in the file of this patent

UNITED STATES PATENTS

| | | |
|---|---|---|
| 2,479,549 | Ayres | Aug. 23, 1949 |
| 2,964,268 | Meyers | Dec. 13, 1960 |
| 3,037,722 | Gerstenberger | June 5, 1962 |